Aug. 8, 1967  W. C. ARNOLD  3,334,906
SHAFT SEAL
Filed Feb. 18, 1965  2 Sheets-Sheet 1

INVENTOR.
WALTER C. ARNOLD
BY
Oscar B Brumbach
ATTORNEY.

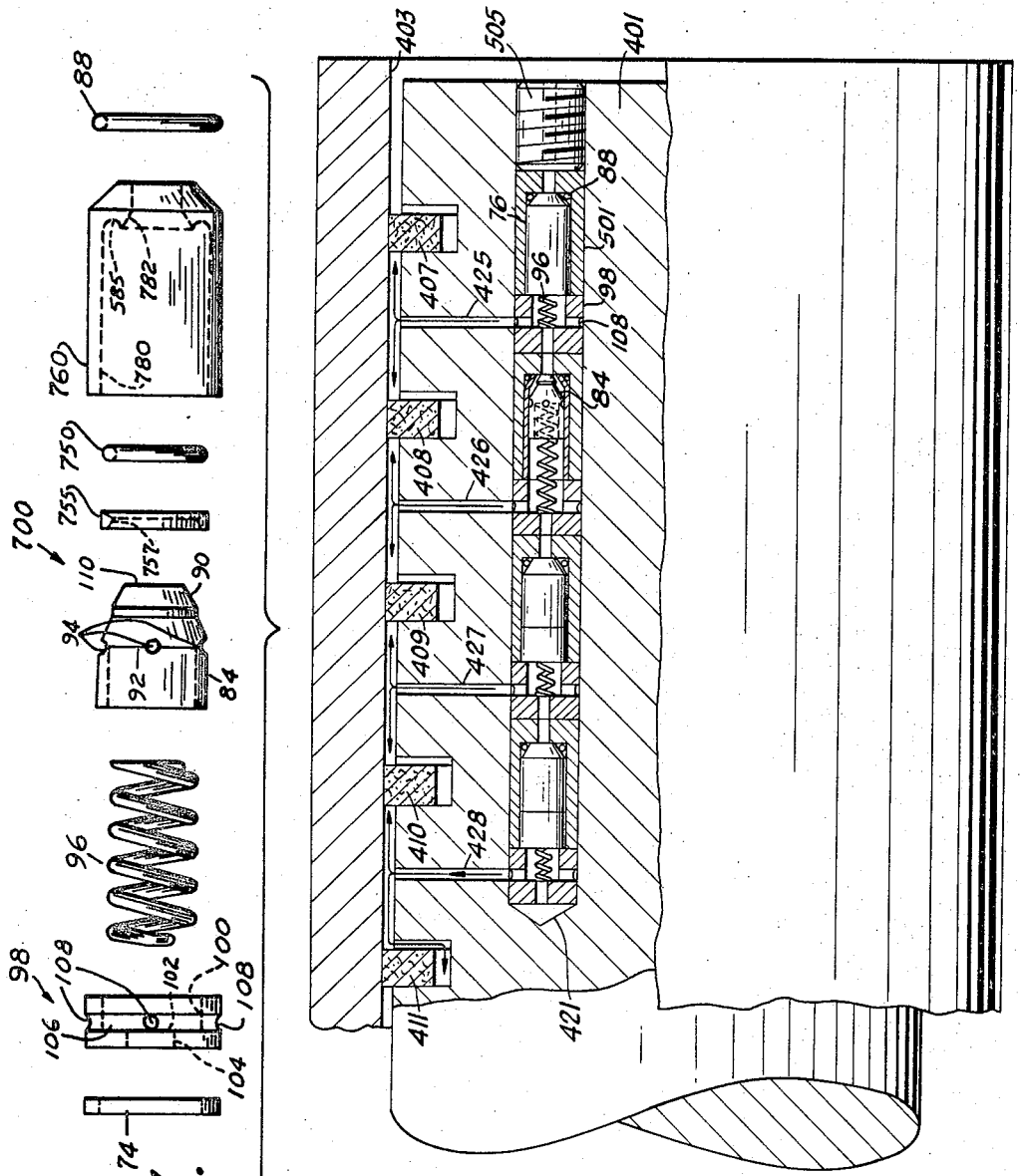

United States Patent Office 3,334,906
Patented Aug. 8, 1967

3,334,906
SHAFT SEAL
Walter C. Arnold, Ellicott City, Md., assignor to Koppers Company, Inc., a corporation of Delaware
Filed Feb. 18, 1965, Ser. No. 433,691
2 Claims. (Cl. 277—3)

ABSTRACT OF THE DISCLOSURE

A shaft seal or rod packing assembly for sealing against the flow of pulsating fluid pressure from one side of a housing to the other around a rod extending through a cavity in the housing comprising a plurality of axially aligned seal cups having seal rings therein surrounding the rod with serially aligned pressure valves between the seal rings operable upon each pressure pulse to permit succeedingly smaller amounts of pressure to flow from the first seal ring to the adjacent seal ring in sequence to thereby subject the seal rings to substantially the same pressure differential.

---

This invention relates generally to rod or shaft seals and more particularly to a shaft seal unit having a plurality of seals in series and pressure control means between certain of said seals.

In high pressure seals where the difference in pressure between the internal portion of the housing and the external portion of the housing is substantial. It is conventional practice to provide a seat unit with a plurality of seals in series to effectively prevent leakage of pressurized fluid around a shaft extending through the housing. One of the disadvantages in using a plurality of seals in series is that the first seal, that is, the seal closest to the source of high pressure, is subjected to the high pressure and wears at a much faster rate than the other seals arranged in series therewith. This uneven wear of the seals requires the entire seal unit to be removed from the housing and the worn seals removed therefrom.

Briefly, the invention herein is directed to a plurality of seals in series and passageways connecting the respective seal portions having pressure responsive means positioned in the passageways and arranged at high pressures above a predetermined pressure to distribute the high pressure to more than one of the seals.

These and other objects and advantages of the present invention will become apparent as this description proceeds in conjunction with the accompanying drawings.

In the drawings:

FIGURE 4 is a view partially in section illustrating a piston with the pressure distributing means of the invention operative to provide a preset pressure differential between the seal rings; and FIGURE 5 is a disassembled view of an alternate embodiment of the pressure responsive valve positioned in the seal cup passageways.

Figure 1:
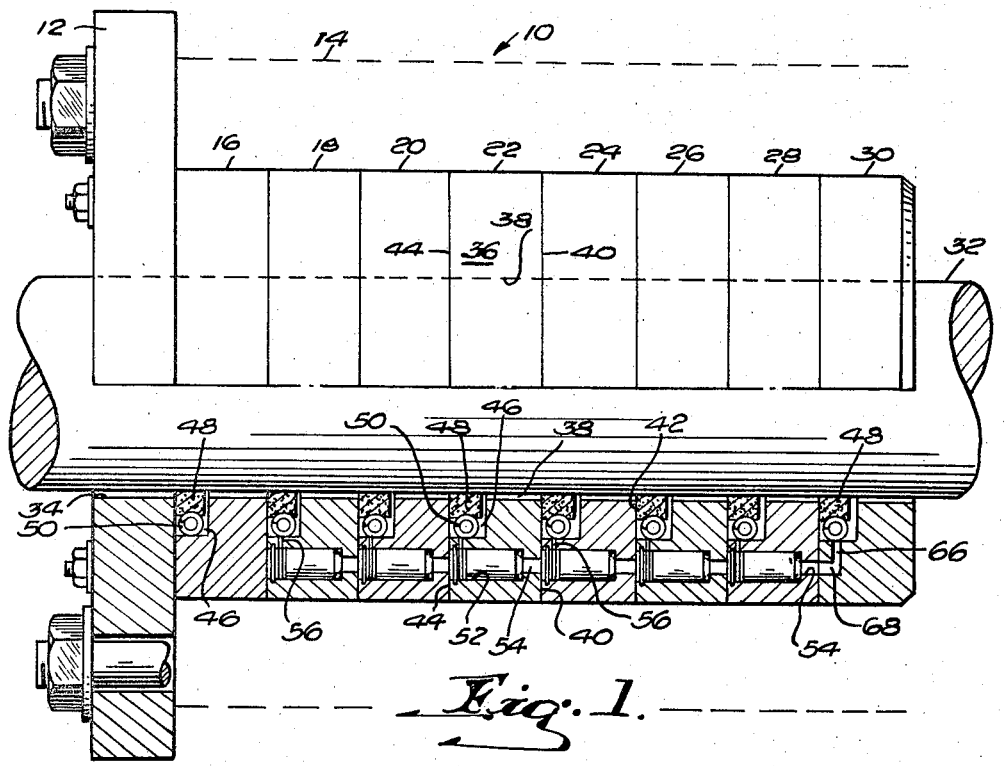
FIGURE 1 is a view partially in section illustrating a rod packing assembly having a pressure distributing means between the seals.

A rod packing assembly generally designated by the numeral 10 is illustrated in FIGURE 1. The assembly includes an end plate or flange 12 that is attached to a housing 14, indicated by phantom lines. Within the housing 14 are a plurality of seal cups or diaphragms indicated by the numerals 16, 18, 20, 22, 24, 26, 28 and 30. The seal cups 18, 20, 22, 24, 26 and 28 are illustrated as being substantially similar in construction. It should be understood, however, that it is within the scope of this invention to employ a fewer number of seal cups that include the pressure distributing means later described. The seal cup 16 which is adjacent the end flange 12 does not, in this embodiment, include the pressure distributing means. The end cup 30, positioned closest to the source of pressure, is subjected to the pressure within the enclosed container and does not include a pressure responsive valve means. A shaft 32 extends through apertures provided in the seal cups and through an aperture 34 in the end flange 12. Since the seal cups 16, 18, 20, 22, 24, 26, 28, and 30 are of substantially the same construction other than the pressure distributing means, only cup 22 will be described in detail and it should be understood the other cups are similar unless stated otherwise.

The seal cups are of a generally annular configuration and have a body portion 36 with a longitudinal central passageway 38 therethrough for the passage of the rod or shaft 32. The body portion 36 has a front end wall 40 with an annular portion 42 adjacent the passageway 38 that serves as a sealing surface for the seal in the adjacent seal cup. The body portion has a rear wall 44 with an annular seal recess 46 therein that opens into the passageway 38 and into said rear wall 44. Positioned within the seal recess 46 is a conventional annular floating ring seal 48 which may be fabricated of metal, plastic, carbon, or the like suitable for the specific application. The ring is segmented and maintained in sealing relation with the shaft 32 by means of an annular garter spring 50. The face of seal 48 abuts the surface 42 of the adjacent seal cup to provide a seal therebetween. The pressure differential on opposite sides of the seal 48 maintains the seal in abutting sealing relation with the face 42 of the adjacent seal cup. Floating seals are conventional in the art and a typical ring seal is described in Koppers Company Bulletin Form 371–M56, entitled "Floating Ring Seal." Other types of ring seals are described in Patent No. 2,980,516 and No. 2,372,103.

The seal cups 18, 20, 22, 24, 26 and 28 each have a longitudinal enlarged bore 52 therethrough (see FIGURE 3) opening into the rear end wall 44 and connected to an axial second bore 54 of reduced diameter. The second bore 54 opens into the front end wall 40. A radial passageway 56 connects the seal recess 46 with the bore 52 adjacent the rear end wall 44. The seal cups 18, 20, 22, 24, 26 and 28 each has the previously described longitudinal bores that are axially aligned so that a passageway is provided from seal cup 28 to seal cup 18 through the respective bores, and the seal recessed portions 46 of each of the seal cups 18, 20, 22, 24, 26 and 28 are connected to the longitudinal passageway by means of radial passageways 56. Suitable O-ring grooves 58 and 60 are provided for O-rings 62 and 64 in the seal cup rear end walls 44 to provide a fluid tight connection therebetween.

The end seal cup 30 has a radial passageway 66 that is connected with a longitudinal passageway 68 which, in turn, is coaxial with and connected to the passageway 54 of the adjacent seal cup 28. The end seal cup 16 adjacent the flange 12 does not have a pressure distributing bore therein. It should be understood, however, depending upon the use to which the packing seal is subjected that a greater or lesser number of seal cups may be provided with the above described pressure distributing passageways.

The enlarged bore 52 in each of the seal cups is adapted to receive a relief valve assembly generally designed by the numeral 70. There is provided in the bore 52 an annular recess 72 for a snap ring 74 that maintains the pressure relief valve 70 in operative position.

The pressure relief valve 70 includes a cylindrical relief valve housing 76 having a central bore 78 therethrough. The end portion 80 of the valve housing 76 is frusto conical in shape and has an inwardly tapered inner surface 82 that forms a seal from the valve 84. The valve housing 76 is positioned in the bore 52 with the front edge portion abutting the shoulder 86 of bore 52 with the O-ring 88 positioned between the shoulder and the external frusto conical surface 80 to provide a seal therebetween. The opening in the front end of the valve housing 76 has substantially the same dimension as the bore 54.

Figure 3:
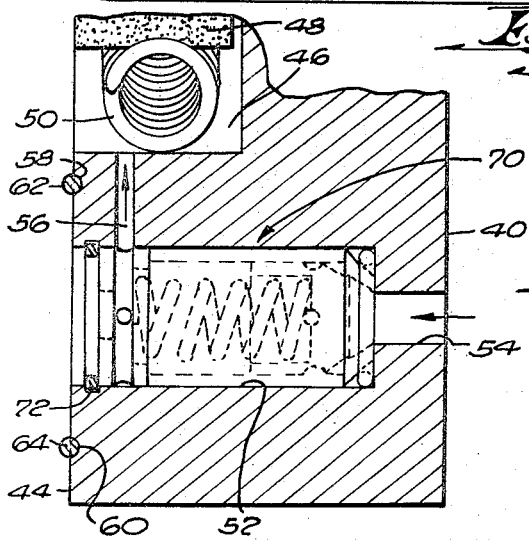
FIGURE 3 is an enlarged detail view in section illustrating the pressure responsive valve in an assembled condition and in a passageway provided therefor in a seal cup or diaphragm.

A valve 84 having a tapered front end portion 90 is positioned within the bore 78 of housing 76. The tapered front end portion 90 of valve 84 has substantially the same configuration as the valve seat 82 in housing 76 so that when the portion 90 abuts the seat 82 the opening therebetween is closed and the valve assembly is in a closed position and pressurized fluid cannot flow therethrough. The rear portion of valve 84 is cylindrical and has a rear wall 92 and radial openings 94. A coil spring 96 is positioned within the cylindrical rear portion of valve 84 and has one end abut the wall 92. The valve housing 76, valve 84 and spring 96 are positioned within the bore 52, as illustrated in FIGURE 3. A spring guide 98 has an enlaged bore 100 extending therethrough to a rear wall 102 and a bore 104 of reduced diameter extending through the rear wall 102. There is a circumferential groove 106 adjacent the rear wall 102 with radial openings 108 therethrough. The spring guide 98 is positioned within the bore 52 and has the free end of spring 96 abut the rear wall 102. The spring guide 98 is moved inwardly within the bore 52 and the snap ring 74 is positioned in the receiving groove 72 to maintain the valve member 84 in a closed abutting position against the valve seat 82.

The spring 96 is so constructed that when the front face of valve 84 is subjected to a preselected pressure, the valve 84 will move toward the left as viewed in FIGURE 3 to move the tapered portion 90 away from the valve seat 82 and permit the pressurized fluid to flow around the tapered portion 90 of valve 84 and inwardly through the radial apertures 94 to the internal bore of valve 84. The pressurized fluid flowing through the valve 84 passes into the bore 100 of the spring guide 98 and radially through apertures 108 and linearly through the bore 104 of reduced diameter. The external grooved portion 106 of the spring guide 98 is aligned with the radial passageway 56 that connects the bore 52 with the seal recess 46. Thus when the valve 84 is moved away from the valve seat 82, the pressurized fluid flowing into the bore 52 flows radially inwardly through passageway 56 into the seal ring recess 46 to subject the rear face of the seal to an increased pressure and flows through the bore 104 in spring retainer 98 into the adjacent axially aligned bore 54 of the adjacent seal cup.

The valve assembly 70 in seal cup 28 is subjected to substantially the same pressure as the seal 48 in the first seal cup 30. Thus the valve assembly 70 in seal cup 28 is subjected to substantially the same pressure as the seal 48.

With this arrangement the pressure from the preceding seal cup passes through the passageways 66 and 68 into the bore 54 of seal cup 28. That pressure which is beyond a predetermined pressure urges the valve 84 against the compressive action of the coil spring 96 to permit the release of this pressure within the bore 52. This pressure is then bled into the seal recess 46 through the passageway 56 and acts on the seal ring within the seal recess 46 to substantially control the pressure differential between the adjacent seal rings 48 and thereby tend to equalize the wear on the respective seal rings 48. Similiarly, a pressure beyond a predetermined pressure opens the valve 84 in seal cup 26 to again distribute the pressure between the rings in adjacent seal cups 26 and 28 and tend to equalize wear therebetween.

It is readily apparent with the herein described invention that all of the seal rings, if desired, may be subjected to substantially the same pressure differential by providing coil springs that require substantially the same pressure differential to compress the same and open the valve 84. It should also be understood that it is within the scope of this invention to provide springs 96 having different compressive forces so that the seal rings within the respective recesses may be subjected to different pressure differentials.

FIGURE 4 illustrates an embodiment of the invention for use with a piston 401 which is adapted to be reciprocated in a cylinder 403. Piston 401 is provided with the customary rings 407, 408, 409, 410, 411 for sealing against leakage of pressure from within the piston to the outside.

In accordance with this invention, an aperture or recess 421 is provided in piston 401, as by drilling. At selected locations between the rings, laterally or radially extending apertures 425, 426, 427, and 428 are also provided to intersect the longitudinally extending aperture 421.

Figure 2:
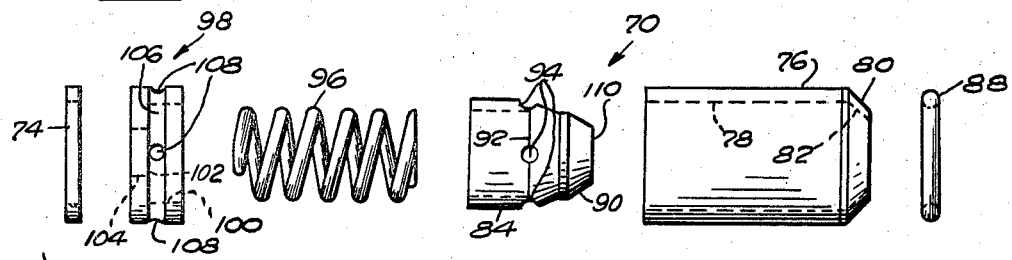
FIGURE 2 is a disassembled view of the pressure responsive valve positioned in the seal cup passageways.

In aperture 421 is placed a series of assemblies, each comprising a spring guide 98, an axillary sleeve 501, a spring 96, relief housing 76, O-ring 88, and valve 84. For simplicity, only one assembly is numbered. These are all similar to the unit illustrated in FIGURE 2. The assembly is so dimensional that the radial opening 108 of a spring guide 98 releases pressure into a lateral aperture 425, 426, 427 or 428. The axillary sleeve 501 renders the use of a snap ring such as 74 of FIGURE 2 unnecessary. The assembly is held in position in aperture 421 by a hollow set screw 505.

The operation of the unit shown in FIGURE 4 is similar to the operation described above in connection with the rod seal. The pressure is exerted through the hollow set screw 505 and through the first assembly. A preselected pressure differential releases through aperture 108 of spring guide 98 to aperture 425. Thus a preset pressure differential is maintained across ring 407. This action is repeated to provide a preset pressure differential across each of the other rings 408, 409, and 410.

Although not essential, it may be desirable to use an alternate embodiment of the pressure relief valve 70 as illustrated in FIGURE 5 and generally designated by the numeral 700. The valve 700 corresponds in all respects to valve 70 except that an O-ring 750 and a back-up ring 755 are placed between the tapered portion 90 and an inwardly tapered portion 782 of the valve housing 760. Valve housing 760 is similar to housing 76 except that the inwardly tapered inner surface 782 is provided with a circumferential groove 585 in a manner to partially receive O-ring 750. Back-up ring 755 is constructed to fit within the central bore 780 with an inner circumference 757 made to seat against tapered portion 90. Thus, when assembled, the back-up ring 755 is urged to the right as viewed in FIGURE 5 by coaction with tapered portion 90 thereby pressing O-ring 750 into groove 585 so that the O-ring is squeezed against tapered portion 90 to form a seal when the valve assembly is in a closed position so that pressurized fluid cannot flow therethrough.

I claim:
1. A rod packing assembly for sealing against the flow of pulsating fluid pressure from one side of a housing to the opposite side around a rod extending through an annular cavity in said housing, comprising:
   a plurality of axially aligned annular seal cups surrounding said rod and secured in said cavity against a flange provided on said housing;
   each of said seal cups having ring seal means within a seal recess provided in said cups and in sealing engagement with said rod for sealing against the flow of fluid pressure around said rod;
   each of said seal cups between the outermost seal cups provided with axially aligned longitudinal bores spaced from said seal recess and also provided with radial bores connecting each longitudinal bore with the corresponding seal recess in said cup;
   said outermost cup adjacent the high pressure side of said assembly provided with a passageway communi- cating with said high pressure and said longitudinal bore of the adjacent cup thereby placing said high pressure in communication with each of said seal ring means except the seal ring means in said outermost cupt adjacent said flange; and a series of pressure responsive members comprising, valve means in each of said longitudinal bores operable to open in response to substantially equal fluid pressure, whereby each of said seal ring means is sequentially subjected to a substantially equal pressure differential upon each pulse of said fluid pressure.

2. The rod packing assembly of claim 1 in which said valve means includes a pressure relief valve comprising:

a cylindrical valve housing having a central bore therethrough and a frusto-conical end portion with an internal valve seat;

a cylindrical valve member slidably positioned in said valve housing and operable to abut said valve seat and close said central bore;

a spring means abutting said valve member and urging said valve member toward a closed position;

an annular spring retainer having radial apertures therethrough in alignment with said radial bore thereby connecting said longitudinal bore with said seal ring recess; and retainer means for maintaining said spring retainer and said pressure relief valve operatively positioned in said longitudinal bore.

References Cited

UNITED STATES PATENTS

| | | | |
|---|---|---|---|
| 2,064,969 | 12/1936 | Carr et al. | 277—3 X |
| 2,175,868 | 10/1939 | Bentley | 277—3 |
| 2,856,209 | 10/1958 | Watson | 277—28 |
| 3,271,037 | 10/1966 | Hammond | 277—27 |

SAMUEL ROTHBERG, *Primary Examiner.*